United States Patent
Kinoshita et al.

(10) Patent No.: US 6,287,667 B1
(45) Date of Patent: Sep. 11, 2001

(54) POLYESTER FILM AND CAPACITOR USING THE SAME

(75) Inventors: Shinichi Kinoshita; Yoshinori Sato, both of Tokyo; Yoshio Meguro, Shiga-ken, all of (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 0 days.

(21) Appl. No.: 09/274,912

(22) Filed: Mar. 23, 1999

Related U.S. Application Data

(63) Continuation-in-part of application No. 08/769,514, filed on Dec. 19, 1996, now abandoned.

(30) Foreign Application Priority Data

| Dec. 22, 1995 | (JP) | 7-334814 |
| Jul. 3, 1996 | (JP) | 8-192979 |
| Aug. 20, 1996 | (JP) | 8-218635 |

(51) Int. Cl.[7] ............ B32B 15/04; B32B 15/08; B32B 27/08; B32B 27/36; B32B 27/40
(52) U.S. Cl. ............ 428/141; 428/213; 428/215; 428/216; 428/423.1; 428/423.7; 428/425.8; 428/457; 428/458; 428/480; 428/694 ST; 428/694 SG; 428/910; 264/288.4; 264/290.2
(58) Field of Search ............ 428/141, 423.1, 428/423.7, 425.8, 457, 458, 480, 694 TS, 694 TR, 694 BS, 694 ST, 694 SG, 910, 212, 213, 215; 264/288.4, 290.2

(56) References Cited

U.S. PATENT DOCUMENTS

| 4,704,325 | 11/1987 | Crocker | 428/323 |
| 4,971,863 | 11/1990 | Hart | 428/458 |
| 5,379,180 | 1/1995 | Kinoshita | 361/323 |
| 5,391,429 | 2/1995 | Otani et al. | 428/327 |
| 5,540,974 | 7/1996 | Hoseki et al. | 428/141 |
| 5,581,435 | 12/1996 | Kinoshita et al. | 361/301.5 |
| 5,612,115 | 3/1997 | Kinoshita et al. | 428/141 |

FOREIGN PATENT DOCUMENTS

| 0 639 468A | 2/1995 | (EP) . |
| 0 665 563A | 8/1995 | (EP) . |
| 0 780 857 A2 | * 6/1997 | (EP) . |

* cited by examiner

Primary Examiner—Vivian Chen
(74) Attorney, Agent, or Firm—Foley & Lardner

(57) ABSTRACT

A biaxially oriented polyester film for capacitors, wherein the polyester film comprises a polyester containing 80 mol % or more polyethylene terephthalate units, has at least one coating layer composed of water soluble or water dispersible resin, and has a heat shrinkage stress satisfying the following formulae (1) to (3):

| $S_{150}$ | < 200 g/mm$^2$ |
| $S_{150}-S_{120}$ | < 100 g/mm$^2$ |
| $S_{max}$ | < 500 g/mm$^2$ | wherein $S_{150}$ and $S_{120}$ represent the values of heat shrinkage stress per unit cross section area of the film at 150° C. and 120° C., respectively, and $S_{max}$ represents the maximum value of the heat shrinkage stress at a temperature within the rage of not less than 150° C. and not more than the melting point of the film.

14 Claims, No Drawings

POLYESTER FILM AND CAPACITOR USING THE SAME

CROSS REFERENCE TO RELATED APPLICATION

This is a continuation-in-part of application Ser. No. 08/769,514, filed Dec. 19, 1996 abandoned.

BACKGROUND OF THE INVENTION

The present invention relates to a biaxially oriented polyester film and a capacitor using the same. More particularly, it relates to a biaxially oriented polyester film for a capacitor and a film capacitor using the same, which film has excellent adhesion properties for deposited metal, and is capable of providing high-level electrical properties and moist heat resistance to capacitor.

Polyester films represented by polyethylene terephthalate are popularly used as a film of magnetic tape, packaging film and makeup film because of their excellent mechanical and electrical properties, high heat resistance and chemical resistance in well balanced and also excellent cost performance. Miniaturization of electrical devices in recent years has intensified the request for reducing the size of a film capacitor comprising polyester film and deposited metal, and the demand of such capacitor increases more and more.

Incidentally, in the above polyester film for capacitor, the following excellent electric properties are required.

(1) The dielectric strength property is excellent and there is no insulation fault. In case where the thickness of the film is thin, the insulation property is deteriorated by a foreign substance in the film or thickness uniformity.

(2) Dielectric properties such as dielectric constant and dielectric loss are excellent.

Especially, by the reduction of the film thickness attended with the request of miniaturization of capacitor, the property requirements for the polyester film used as dielectric are very severe. Further, an improvement of the property of polyester film is required under consideration of an influence by the coating layer.

Regarding the above-mentioned electric properties, it has been required to maintain good electric properties and to little change in the electric properties in the wide temperature range of an ordinary temperature to a high temperature. Namely, it is necessary that the electric properties is stable under the condition of high temperature and humidity for a long period of time, that is, it is required that the film has heat and humid stability of the electric properties.

In order to satisfy the above electric property requirements, a method of using a polyester film having a coating layer as a base film for capacitor has been proposed. However, there are some problems in this method. In case where the coating thickness is very small in.comparison with the polyester film thickness, the coating layer gives little influence to electrical properties of the polyester film and no problem arises. However, when the polyester film thickness is reduced, it becomes necessary to give considerations to the influence of the coating layer since the ratio of the thickness of the coating layer to that of the whole sheet is correspondingly enlarged.

Further, in order to attain the high capacitor property, it is required to consider the influence of heat-damage of the base film during metallization operation. Namely, it is required that even if metallization operation for the base film is carried out in severe heat condition, the film maintains good electric properties.

It is also notable as one of causes deteriorating the electric properties that by the dimensional change of the film caused by the thermal influence during in the capacitor production process, mechanical and electrical contact of the deposited metal with terminal electrodes (usually, metallicon) becomes inferior. This dimensional change of the film causes an increase of dielectric loss to give adverse effect to the capacitor properties.

The conventional polyester film for capacitor having the coating layer is not necessarily excellent in dielectric loss and alternative current withstand voltage, and further, by the continuous using, the electrostatic capacity of the capacitor is remarkably reduced.

By the present inventor's earnest studies for solving the above problems, it has been found that when the polyester film having a coating layer has a specific dimensional stability, the excellent electric properties and long-time stability against moist heat in the film are satisfied simultaneously and the excellent properties as a dielectric for capacitor are shown. The present invention has been based on this finding.

SUMMARY OF THE INVENTION

The object of the present invention is to provide a biaxially oriented polyester film for capacitor, which satisfies excellent electric properties and long-time stability against moist and heat, and has excellent properties as dielectric for capacitor.

To accomplish the aim, in a first aspect of the present invention, there is provided a biaxially oriented polyester film for capacitor having at least one coating layer of a thickness of 0.005 μm to 0.5 μm on a polyester film, which coating layer comprises a water soluble or water dispersible resin, having a total thickness of 1.0 to 21 μm, and having a stress of heat shrinkage satisfying the following formulae (1) to (3):

| | | |
|---|---|---|
| $S_{150}$ | $< 200$ g/mm$^2$ | (1) |
| $S_{150}-S_{120}$ | $< 100$ g/mm$^2$ | (2) |
| $S_{max}$ | $< 500$ g/mm$^2$ | (3) | where $S_{150}$ and $S_{120}$ represent the values of heat shrinkage stress per unit cross section area of the film at 150° C. and 120° C., respectively, and $S_{max}$ represents the maximum value of the heat shrinkage stress at the temperature within a range of not less than 150° C. and not more than the melting point of the film.

In a second aspect of the present invention, there is provided a biaxially oriented polyester film for capacitor having at least one coating layer of a thickness of 0.005 μm to 0.5 μm on a polyester film, which coating layer comprises water soluble or water dispersible resin, having a total thickness of 1.0 to 21 μm. and having a dimensional change percentage of the film in the longitudinal direction at 200° C. measured by a thermomechanical analyzer (TMA) within the range from −2.0% to +2.0%.

In a third aspect of the present invention, there is provided a biaxially oriented polyester film for capacitor having at least one coating layer of a thickness of 0.005 μm to 0.5 μm on a polyester film, which coating layer comprises water soluble or water dispersible resin, having a total thickness of 1.0 to 21 μm, having a dimensional change percentage of the film in the longitudinal direction at 200° C. measured by a thermomechanical analyzer (TMA) within the range from −2.0% to +2.0%, and having a heat shrinkage stress satisfying the following formulae (1) to (3):

| | | |
|---|---|---|
| $S_{150}$ | < 200 g/mm² | (1) |
| $S_{150}-S_{120}$ | < 100 g/mm² | (2) |
| $S_{max}$ | < 500 g/mm² | (3) | where $S_{150}$ and $S_{120}$ represent the values of heat shrinkage stress per unit cross section area of the film at 150° C. and 120° C., respectively, and $S_{max}$ represents the maximum value of the heat shrinkage stress at the temperature within a range of not less than 150° C. and not more than the melting point of the film.

In a fourth aspect of the present invention, there is provided a metallized biaxially oriented polyester film for capacitor comprising at least one coating layer of a thickness of 0.005 μm to 0.5 μm dispersed on a polyester film, which coating layer comprises water soluble or water dispersible resin, and a deposited metal on the coating layer; having a total thickness of 1.0 to 21 μm; and having a heat shrinkage stress satisfying the following formulae (1) to (3):

| | | |
|---|---|---|
| $S_{150}$ | < 200 g/mm² | (1) |
| $S_{150}-S_{120}$ | < 100 g/mm² | (2) |
| $S_{max}$ | < 500 g/mm² | (3) | where $S_{150}$ and $S_{120}$ represent the values of heat shrinkage stress per unit cross section area of the film at 150° C. and 120° C., respectively, and $S_{max}$ represents the maximum value of the heat shrinkage stress at the temperature within a range of not less than 150° C. and not more than the melting point of the film.

In a fifth aspect of the present invention, there is provided a metallized biaxially oriented polyester film for capacitor comprising at least one coating layer of a thickness of 0.005 μm to 0.5 μm on a polyester film, which coating layer comprises water soluble or water dispersible resin, and a deposited metal on the coating layer; having a total thickness of 1.0 to 21 μm; and having a dimensional change percentage of the film in the longitudinal direction at 200° C. measured by a thermomechanical analyzer (TMA) within the range from −2.0% to +2.0%.

In a sixth aspect of the present invention, there is provided a metallized biaxially oriented polyester film for capacitor comprising at least one coating layer of a thickness of 0.005 μm to 0.5 μm on a polyester film, which coating layer comprises water soluble or water dispersible resin, and a deposited metal on the coating layer; having a total thickness of 1.0 to 21 μm; having a dimensional change percentage of the film in the longitudinal direction at 200° C. measured by a thermomechanical analyzer (TXA) within the range from −2.0% to +2.0%, and having a heat shrinkage stress satisfying the following formulae (1) to (3):

| | | |
|---|---|---|
| $S_{150}$ | < 200 g/mm² | (1) |
| $S_{150}-S_{120}$ | < 100 g/mm² | (2) |
| $S_{max}$ | < 500 g/mm² | (3) | where $S_{150}$ and $S_{120}$ represent the values of heat shrinkage stress per unit cross section area of the film at 150° C. and 120° C., respectively, and S represents the maximum value of the heat shrinkage stress at the temperature within a range of not less than 150° C. and not more than the melting point of the film.

In a seventh aspect of the present invention, there is provided a capacitor comprising a metallized biaxially oriented polyester film comprising at least one coating layer of a thickness of 0.005 μm to 0.5 μm on a polyester film, which coating layer comprises water soluble or water dispersible resin, and a deposited metal on the coating layer; having a total thickness of 1.0 to 21 μm; and having a heat shrinkage stress satisfying the following formulae (1) to (3):

| | | |
|---|---|---|
| $S_{150}$ | < 200 g/mm² | (1) |
| $S_{150}-S_{120}$ | < 100 g/mm² | (2) |
| $S_{max}$ | < 500 g/mm² | (3) | where $S_{150}$ and $S_{120}$ represent the values of heat shrinkage stress per unit cross section area of the film at 150° C. and 120° C., respectively, and $S_{max}$ represents the maximum value of the heat shrinkage stress at the temperature within a range of not less than 150° C. and not more than the melting point of the film.

In a eighth aspect of the present invention, there is provided a capacitor comprising a metallized biaxially oriented polyester film comprising at least one coating layer of a thickness of 0.005 μm to 0.5 μm on a polyester film, which coating layer comprises water soluble or water dispersible resin, and a deposited metal on the coating layer; having a total thickness of 1.0 to 21 μm; and having a dimensional change percentage of the film in the longitudinal direction at 200° C. measured by a thermomechanical analyzer (TMA) within the range from −2.0% to +2.0%.

In a ninth aspect of the present invention, there is provided a capacitor comprising a metallized biaxially oriented polyester film comprising at least one coating layer of a thickness of 0.005 μm to 0.5 μm on a polyester film, which coating layer comprises water soluble or water dispersible resin, and a deposited metal on the coating layer; having a total thickness of 1.0 to 21 μm; having a dimensional change percentage of the film in the longitudinal direction at 200° C. measured by a thermomechanical analyzer (TMA) within the range from −2.0% to +2.0%, and having a heat shrinkage stress satisfying the following formulae (1) to (3):

| | | |
|---|---|---|
| $S_{150}$ | < 200 g/mm² | (1) |
| $S_{150}-S_{120}$ | < 100 g/mm² | (2) |
| $S_{max}$ | < 500 g/mm² | (3) | where $S_{150}$ and $S_{120}$ represent the values of heat shrinkage stress per unit cross section area of the film at 150° C. and 120° C., respectively, and $S_{max}$ represents the maximum value of the heat shrinkage stress at the temperature within a range of not less than 150° C. and not more than the melting point of the film.

DETAILED DESCRIPTION OF THE INVENTION

A detailed description of the present invention follows.

The biaxially oriented polyester film for capacitor according to the present invention (hereinafter referred to as simply "film") constitutes polyester prepared from aromatic dicarboxylic acid or ester thereof and glycol as main starting materials. The structural repeating units of polyester is constituted from polyethylene terephthalate units, ethylene 2,6-naphthalate units or 1,4-cyclohexanedimethylene terephthalate units of 80 mol % or more in the structural repeating units. In the polyester units, other ester units comprising aromatic dicarboxyl acid and glycol may be contained within the above range.

Examples of the other aromatic dicarboxyl acid constituting the polyester may include 2,6-naphthalenedicarboxylic acid, isophthalic acid, 5-sodiumsulfoisophthalic acid, phthalic acid, adipic acid, azelaic acid, sebacic acid, 4,4'-diphenyldicarboxylic acid and oxycarboxylic acids such as p-oxyethoxybenzoic acid etc.

Examples of the other glycol constituting the polyester may include diethylene glycol, propylene glycol, butanediol, 1,4-cyclohexanedimethanol, neopentyl glycol, polyethylene glycol and polytetramethyleneglycol etc.

The intrinsic viscosity of the polyester is usually not less than 0.45, preferably 0.50 to 1.0, more preferably 0.52 to 0.80. When the intrinsic viscosity of the polyester is less than 0.45, the productivity at the film production may be low and the mechanical property of the film may lower. When the intrinsic viscosity of the polyester is more than 1.0, the melt extrusion of polymer may be unstable.

In the present invention, in order to prevent causing flaw in the film production process and improve the film handling property by providing slipperiness to the film, particles are preferably contained in the polyester to form adequate protrusions on the film surface.

Examples of the particles may include inorganic particles such as calcium carbonate, calcium phosphate, silica, kaolin, talc, titanium oxide, alumina, barium sulfate, calcium fluoride, lithium fluoride, zeolite and molybdenum sulfide etc., organic particles such as crosslinked polymer particles and calcium oxalate, and precipitating particles forming in the polymerization of the polyester.

In the present invention, the average particle size of the above particles is usually 0.005 to 5.0 $\mu$m, preferably 0.01 to 3.0 $\mu$m. When the average particle size is more than 5.0 $\mu$m, the insulation of the film may be deteriorated by the excess roughness or an insulation fault may be caused by the falling of the particles. When the average particle size is less than 0.005 $\mu$m, the scratch on the film may be caused in the production process and the film handling property may be deteriorated because the height of the protrusions are insufficient.

The content of the above particles in the polyester is usually 0.01 to 3.0% by weight, preferably 0.05 to 2.0% by weight, more preferably 0.1 to 1.0% by weight based on the weight of polyester. When the said content is less than 0.01% by weight based on the weight of polyester, the slipperiness of the film may be not sufficient by lack of the protrusion on the film surface. When the said content is more than 3.0% by weight based on the weight of polyester, the scratch on the film may be caused and the insulation fault may be caused by large projections formed by agglomeration of the particles.

The above particles may be used as a mixture of two or more kinds particles and a mixture comprising the same kind particles but the different particle size. In the above cases, it is preferred that the particle size and the content of the above particles in the polyester are within the above scope.

The particles may be added in the preparation of the polyester and also may be added to the polyester directly. In case of the addition of the particles in the preparation of the polyester, it is preferred to add the particles as a slurry dispersing into ethylene glycol at the any step of the preparation of the polyester.

On the other hand, in case of the addition of the particles to the polyester directly, it is preferred to add and mix a slurry dispersing into water or organic solvent having a boiling point of not more than 200° C. to the polyester by use of a twin-screw kneader extruder. To the addition particles, the pre-treatment such as disintegration, dispersion, classification and filtration may be conducted, if necessary.

As a method of controlling the particle content, there is a method comprising preparing the master material containing the particles in high concentration by the above-mentioned way and mixing the master material into a material containing substantially no particle to control the particle content.

Other additives such as antistatic agent, stabilizer, lubricant, crosslinking agent, anti-block agent, antioxidant, colorant, light screen, ultraviolet absorber, etc., may also be optionally contained in the film within limits not prejudicious to capacitor properties.

The polyester film of the present invention may have a multilayer structure as far as the finally provided properties of the film meet the specific requirements of the present invention. In the case of multilayer structure, as a part of the layers, on other layer than polyester layer may be used.

The polyester film of the present invention has on at least one side thereof a coating layer composed of a water-soluble or water-dispersible resin. Examples of the resins usable for forming the coating layer include polyester resin, polyamide resin, polystyrene resin, polyacrylate resin, polycarbonate resin, polyarylate resin, polyvinyl chloride resin, polyvinylidene chloride resin, polyvinyl butyral resin, polyvinyl alcohol resin, polyurethane resin and their copolymers or mixtures. Of these coating resins, polyester resin, polyacrylate resin and polyurethane resin are preferred, and urethane resin is the most preferred. When urethane resin is used, it is possible to obtain the film for capacitor having an exceedingly high-degree adhesion properties and long-time stability against moist heat.

Urethane resin refers generically to the high-molecular weight compounds having urethane bonds, and is composed essentially of a polyol, a polyisocyanate, a chain extender and a crosslinking agent.

Examples of the polyols usable as urethane resin component include polyethers such as polyoxyethylene glycol, polyoxypropylene glycol and polyoxytetramethylene glycol, polyesters produced from dehydration reaction of dicarboxylic acids and glycols including polyethylene adipate, polyethylene-butylene adipate and polycaprolactone, polycarbonates having carbonate bonds, acrylic polyols, and castor oil.

Examples of the polyisocyanates include tolylene diisocyanate, phenylene diisocyanate, 4,4'-diphenylmethane diisocyanate, hexamethylene diisocyanate, xylene diisocyanate, 4,4'-dicyclohexylmethane diisocyanate and isophorone diisocyanate.

It is preferred to select an aromatic polyisocyanate having high heat resistance and/or isophorone diisocyanate. In case of using an aromatic polyisocyanate and/or isophorone diisocyanate, their ratio in the isocyanate moiety of the resin is 50 mol % or more, preferably 70 mol % or more.

Examples of the chain extender or crosslinking agent usable as resin component include ethylene glycol, propylene glycol, diethylene glycol, trimethylolpropane, hydrazine, ethylenediamine, diethylenetriamine, triethylenetetramine, 4,4'-diaminodiphenylmethane, and 4,4'-diaminodicyclohexylmethane. As a crosslinking agent, water may be used.

The percentage of polyurethane in the coating layer used in the present invention is usually not less than 30% by weight, preferably not less than 50% by weight, more preferably not less than 70% by weight based on the weight of the coating layer. When the percentage of polyurethane in the coating layer is less than 30% by weight based on the weight of the coating layer, the improvement of adhesion properties and long-time stability against moist heat of the film for capacitor may not be sufficient.

The coating composition according to the present invention should be prepared with water used as medium for safety reasons. Accordingly, the above resin used in the coating composition should be water-soluble or water-dispersible resin. But an organic solvent may be contained as adjunct of the water-soluble or water-dispersible resin. The amount of the added organic solvent should be within the range in which the safety of the coating composition is not failed.

In case where water is used as medium of the coating composition resin, the above resin may be forcibly dispersed by a surfactant, but it is practically more preferable to use a self-dispersed-type coating composition having a hydrophilic nonionic component such as polyethers and a cationic base such as quaternary ammonium salt or a water-soluble or water-dispersible resin having an anionic base, preferably the water-soluble or water-dispersible resin having an anionic base.

The "water-soluble or water-dispersible resin having an anionic group" is a resin combined with a compound having an anionic group by means of copolymerization or graft copolymerization, in which the anionic group is properly selected from sulfonic group, carboxyl group, phosphoric group and salts thereof. The counter ion of the anionic group is usually alkaline metal ion but in the present invention, the counter ion of the anionic group is preferably selected from the amine-type onium ions including ammonium ion.

The content of anionic group in the water-soluble or water-dispersible coating composition having anionic group is preferably 0.05 to 10% by weight, more preferably 0.1 to 8% by weight. When the anionic group content is less than 0.05% by weight, water solubility or water dispersibility of the resin tends to worsen, while when said group content is more than 10% by weight, there arise the problems such as deterioration of water resistance of the undercoat layer, moisture absorption of the coating layer to cause blocking each film, and deterioration of adhesion properties of the film under moist heat conditions.

The increase of the alkaline metal content in the coating solution tends to lead to lowered moist heat resistance of capacitor. Especially, when the capacitor is placed under a high-temperature and high-humidity condition, with a DC voltage applied thereto, there takes place a sharp drop of electrostatic capacity of the capacitor. In certain cases, therefore, a deionizing treatment of the coating solution may be required to reduce the alkaline metal content in the coating layer. The alkaline metal content in the coating solution used in the present invention is preferably not more than 500 ppm, more preferably not more than 200 ppm, still more preferably not more than 100 ppm, most preferably not more than 50 ppm in the solid matter of the coating solution.

In the coating solution used in the present invention, various types of crosslinking agent such as methylolated or alkylolated urea, melamine, guanamine, acrylamide and polyamide compounds; epoxy compounds; aziridine compounds; block polyisocyanate; silane coupling agents; titanium coupling agents; zirco-aluminate coupling agent, peroxides, heat- or light-reactive vinyl compounds, photosensitive resins and the like may be contained for improving anti-block properties, water resistance, solvent resistance and mechanical strength of the coating layer.

Also, for improving anti-block properties or slip property of the film, fine particles of inorganic material such as silica, silica sol, alumina, alumina sol, zirconium sol, kaolin, talc, calcium carbonate, calcium phosphate, titanium oxide, barium sulfate, carbon black, molybdenum sulfide, antimony oxide sol, etc., or fine particles composed of organic material such as polystyrene, polyethylene, polyamide, polyester, polyacrylic ester, epoxy resin, silicone resin, fluorine resin, etc., may be contained in the coating solution.

The coating solution used in the present invention may also contain other additives such as defoaming agent, applicability improver, thickener, antistatic agent, organic lubricant, ultraviolet absorber, foaming agent, dye, pigment, etc., if necessary.

Further, in the coating solution used in the present invention, other resin than the resin of the present invention, such as acrylic resin, polyester resin, vinyl resin, etc., may be contained for improving the properties of the coating solution or the coating layer. Especially, use of polyester resin is preferable as it helps improve interlaminar adhesion properties between the base polyester film and the coating layer in moist heat atmospheres. In this case, however, the percentage of the polyester resin in the coating layer is preferably not more than 30 wt %.

Various methods are available for applying the coating solution on the surface of the polyester film. The coating process may be conducted by using a suitable coating device such as reverse roll coater, gravure coater, rod coater, air doctor coater, etc., shown in Y. Harasaki: Coating System, Maki Shoten, 1979 or other coating devices. The coating process may be conducted during the film production process or after the film production process. Especially, considering the uniformity of coating layer thickness and the production efficiency, the coating method conducted during the film production process is preferable.

As the above in-process method, it is preferred that the coating solution is applied on a non-oriented polyester film and the film is biaxially stretched successively or simultaneously; the coating solution is applied on a uniaxially stretched polyester film and then the film is stretched in the direction orthogonal to the initial uniaxial stretching direction; the coating solution is applied on a biaxially stretched polyester film and then the film is further stretched in the transverse and/or longitudinal direction.

Thickness of the coating layer is usually in the range of 0.005 to 0.5 $\mu$m, preferably 0.01 to 0.3 $\mu$m, more preferably 0.03 to 0.1 $\mu$m. It needs to be thinned for satisfying the request for miniaturization of capacitor. When the thickness of the coating layer is more than 0.5, the electric properties of the film may be deteriorated. When the thickness of the coating layer is less than 0.005, uneven coating or coating hole may be caused.

Water droplet contact angle of the coating layer formed in the manner described above is preferably not less than 60°, more preferably not less than 62°. When water droplet contact angle is less than 60°, water resistance of adhesion properties to the metallized film may be deteriorated. The above water droplet contact angle may be controlled by selecting the amount of hydrophilic groups, the amount of emulsifier and the amount of hydrophilic compound used.

Center line average roughness (Ra) of the surface of coating layer measured on the surface side is preferably in the range of 0.005 to 0.5 $\mu$m. When Ra is less than 0.005 $\mu$m, the produced film fails to have satisfactory slip property and is poor in workability. On the other hand, when Ra exceeds 0.5 $\mu$m, the film surface proves too rough, thereby giving adverse effect to dielectric strength and moist heat resistance of capacitor. The Ra is more preferably 0.01 to 0.3 μm, still more preferably 0.02 to 0.1 μm.

In the film according to the present invention, the heat shrinkage stress of the film satisfies the following formulae 1 to 3 so as to provide an excellent long-time stability against moist heat.

| | | |
|---|---|---|
| $S_{150}$ | < 200 g/mm$^2$ | (1) |
| $S_{150}-S_{120}$ | < 100 g/mm$^2$ | (2) |
| $S_{max}$ | < 500 g/mm$^2$ | (3) | where $S_{150}$ and $S_{120}$ represent the values of heat shrinkage stress per unit cross section area of the film at 150° C. and 120° C., respectively, and $S_{max}$ represents the maximum value of the heat shrinkage stress at the temperature within a range of not less than 150° C. and not more than the melting point of the film.

When $S_{150} \geq 200$ g/mm$^2$, the dimensional stability of the film may be insufficient and electrical contacts with edge electrodes in capacitor apt to be unstable, to deteriorate the electric properties of capacitor. The range of $S_{120}$ is not restricted, but usually not less than 10 to 200 g/mm$^2$, preferably not less than 20 to 200 g/mm$^2$. By the present inventor's finding, it is preferred that a certain heat shrinkage stress acts to the film so as to improve more excellently the contact between the cooling can and the polyester film in the metal deposition process. By use of the above condition, the metallization is capable in the remarkably reduced damage by heat.

On the other hand, when $S_{150}-S_{120} \geq 100$ g/mm$^2$, the electric properties of capacitor is deteriorated. The reason of the above deterioration is not clear, but the following reason is presumed.

That is, when the film is run in contacting with the cooling can on condition that the polyester film is not damaged by the heat in the metallization, on condition to occur the ununiformity of temperature, ununiform heat shrinkage stress rises in the polyester film in which $S_{150}-S_{120} \geq 100$ g/mm$^2$. By the uniformity of the heat shrinkage stress, strain and stress remain in the film and slack and shrvelling result. These cause the deterioration of the electric properties. Accordingly, the value of $S_{150}-S_{120}$ should be small, that is, it is essential that the slope of the curve showing the relationship between the heat shrinkage stress and the temperature is small in this temperature range. The value of $S_{150}-S_{120}$ is preferably less than 80 g/mm$^2$, more preferably 70 g/mm$^2$.

In the present invention, in addition to the above condition, $S_{max}$ which represents the maximum value of the heat shrinkage stress at the temperature within a range of not less than 150° C. and not more than the melting point of the film, is less than 500 g/mm$^2$, to provide an excellent long-time stability against moist heat to the film. The $S_{max}$ is preferably less than 400 g/mm$^2$, more preferably less than 350 g/mm$^2$.

In the metallization process of the film, the metallization is conducted under unwinding and running the film with applying constant tension. Accordingly, if the film does not have a sufficient strength (Young's modulus) against the above tension, the polyester film cannot resist the tension and is seriously damaged by the heat in the metallization. By the finding of the present inventors, since the uniformity of the metallized film is deteriorated by the above damage, the yield of the film in the film production process lowers and the electric properties and long-time stability against moist heat of the obtained capacitor deteriorates.

In the present invention, in order to provide a more excellent long-time stability against moist heat to the polyester film, the Young's modulus in the longitudinal direction of the film at the ordinary temperature is not less than 4.5 GPa, preferably not less than 5.0 GPa. Further, in the present invention, the Young's modulus in the longitudinal direction of the film at 100° C. is not less than 1.0 GPa, preferably 1.2 GPa.

It is also important in the present invention that the percentage of the dimensional change of the film in the longitudinal direction at 200° C. measured by a thermomechanical analyzer (TMA) falls in the range from −2.0% to +2.0%, preferably −1.5 to +1.5%. This is of great significance because mechanical and electrical contact of a deposited metal with terminal electrodes (usually metallicon) is unstable when the dimensional change percentage is either greater than +2.0% or smaller than −2.0%.

The total thickness of the polyester film according to the present invention is preferably 1.0 to 21 μm, more preferably 2.0 to 14 μm, still more preferably 3.0 to 9 μm, most preferably not greater than 5 μm. When the total thickness of the film is more than 21 μm, a more high-quality and more small-sized capacitor using the film may not be obtained. When the total thickness of the film is less than 1.0 μm, since the percentage of the occupied thickness of the coating layer is relatively large, the improvement of the electric properties may not be sufficient. "The total thickness" means the sum total of the thickness of the film and the coating layer.

The polyester film according to the present invention is obtained, for example, by the following production process. First, a polyester material and additive used are supplied to an extruder and melt-kneaded at the temperature of not less than the melting point of the polyester, and extruded from a slit-like die to a revolution chill roll as a melting sheet. By cooling the sheet obtained at the temperature of not more than the glass transition point, the melting sheet is chilled and solidified to obtain substantially amorphous non-oriented sheet. In this case, in order to improve the flatness and thickness uniformity of the sheet, it is required that the adherence of the sheet to the revolution chill roll, electrostatic pinning method or liquid coating pinning method are preferably adopted.

Electrostatic pinning method is a method that a wire-like electrode is set on the upper side of the sheet in the perpendicular direction to the sheet running direction, a direct current of about 5 to 10 KV is applied to the electrode for applying electrostatic charge and improving the adherence of the film to the chill roll. Liquid coating pinning method is a method that liquid is uniformly applied on whole or a part of surface of the revolution chill roll (for example, only part contacting the both edges of the sheet), to improve the adherence of the film to the chill roll. In the present invention, the electrostatic pinning method and liquid coating pinning method may be used simultaneously, if necessary.

Then, the above sheet is biaxially stretched to obtain a polyester film. By selecting the appropriate range of the condition of the stretching and heat-treatment, the polyester film having the above shrinkage properties can be obtained. The biaxially stretching is conducted as follows.

First, the above non-oriented sheet is stretched in one direction (longitudinal direction) to obtain a sheet of which birefringence is usually not less than 0.06, preferably not less than 0.08. The stretching is conducted on condition that the stretching temperature is 70 to 150° C. and the stretching ratio is 2.5 to 6. By selecting the stretching temperature and stretching ratio, the desired birefringence is obtained. The stretching in one direction can be conducted by one step or two steps or more.

Then, after the uniaxial oriented film is once cooled under the glass transition temperature or, for example, pre-heated within the temperature range of 80° C. to 150° C. without cooling, the uniaxial oriented film is stretched usually 2.5 to 5 times, preferably 3.0 to 4.5 times in the perpendicular direction (transverse direction) to the uniaxial direction within the same temperature range described above.

It is preferable for attaining the uniformity of the film thickness that the stretching in the longitudinal direction is conducted by two or more steps. A stretching process comprising stretching in transverse direction and stretching in longitudinal direction thereafter is also appropriate. It is preferable in any case that the stretching longitudinal direction is conducted not less than 3.5 times as the total stretching ratio.

To the polyester film obtained by the above, heat-treatment is conducted for 1 to 600 seconds, preferably 1 to 300 seconds, more preferably 1 to 60 seconds at the temperature of 150° C. to 250° C., preferably 180° C. to 250° C., more preferably 200° C. to 240° C. In the above heat-treatment, during or after the heat-treatment, restretching may be conducted in the longitudinal direction, transverse direction, or both directions. In case where the restretching is conducted after the heat-treatment, it is preferred that further heat-treatment as described in the above is conducted again.

As a method to attain the specific scope of the heat shrinkage stress in the film, there is a method comprising heat relaxing treatment in the longitudinal direction, transverse direction or both directions within the range of usually 3 to 30%, preferably 5 to 20%, a method comprising conducting heat-relaxing treatment of the film under off-line and low stress applied.

If the heat-treatment is conducted at the temperature higher than the above restricted temperature range, the heat shrinkage stress and the dimensional change percentage can be reduced, however, the electric properties, particularly the dielectric loss properties of the film are deteriorated. That is, when the temperature of the heat-treatment is more than 240° C. the density of the film is excess high and an excellent electric properties cannot be obtained. On the other hand, when the temperature of the heat-treatment is less than 180° C., the percentage of heat shrinkage of the film cannot be small and the dimension of the film is changed in the process in which the film is subjected to heat in the production process of capacitor, to lower the productivity of capacitor and to deteriorate the capacitor properties such as withstand voltage. If any method described above is used, it is preferable that the heat-treatment is conducted at the temperature within the range of 180° C. to 240° C. accompanied with heat-relaxing treatment of the film to attain the particular heat shrinkage stress and the dimensional change percentage of the film.

In the present invention, in order to further improve the electric properties of the film, the density of the film is not more than 1.3990 g/cm$^3$, preferably 1.3980 g/cm$^3$, more preferably 1.3970 g/cm$^3$. The above range of the film density is attained by properly selecting the above temperature of the heat-treatment. When the film density is more than 1.3990 g/cm$^3$, the excellent electric properties may not be obtained.

The heat-relaxing treatment is preferably carried out without putting restrictions in the width direction of film under a running tension of 0.01 to 1 kg/mm$^2$ at a temperature of 160 to 220° C. for a period of 0.5 to 20 seconds. The film to be subjected to this heat-relaxing treatment is preferably adjusted to have a length in the width direction of at least 500 mm for minimizing running tension and for allowing uniform performance of the treatment. When the film having coating layer of the present invention is heat treated according to a contact system at a high temperature, there may take place transfer of coating layer, so that it is preferable to use an non-contact type heat-relaxing device. For the same reason, use of a heat-floating type treating device is preferable for heat-relaxing treatment.

A heated inert gas, specifically heated air, is preferably used as medium for effecting heat-floating of the film. The heat-relaxing treatment while maintaining a stabilized run of the film is conducted by the heat floating treatment. This is particularly effective for light-gage films which constitute preferred embodiments of the present invention.

In the present invention, the preferred method as a method of producing the coating layer is a method comprising applying the coating solution to the uniaxially stretched film in the film production process, transverse stretching the coated film after the appropriate drying process or no drying process, and conducting the heat-treatment.

According to this coating method, drying of the coating layer can be accomplished simultaneously with stretching and the coating layer thickness can be reduced corresponding to stretch ratio. Further, the uniformity of the thickness of the coating layer is excellent and adhesion of the film to the coating layer is especially tightened, thereby producing a film suited for use as a base film for dielectric capacitor.

The coating composition according to the present invention may be applied either on one side alone or on both sides of the polyester film. In case the coating solution is applied on one side alone, a coating solution other than the specified one may be applied on the opposite side to impart extra properties to the polyester film of the present invention.

The film may be subjected to a chemical treatment or discharge treatment before coating for improving applicability and adhesion properties of the coating composition to the film. Considering the treatment efficiency and the treatment easiness, corona treatment is preferably used. Corona treatment may be conducted after forming the coating layer for improving adhesion properties, etc., of the coating layer of the biaxially stretched polyester film of the present invention.

In the production of capacitor by use of the film according to the present invention, metals usable for metallization of capacitor film include aluminum, palladium, zinc, nickel, gold, silver, copper, indium, tin, chromium, titanium and the like. Among of them, aluminum is most preferred. Oxides of these metals are also usable.

The deposited metal thickness is preferably in the range of 10 to 5,000 Å. As depositing method, usually vacuum deposition is used, but electroplating, sputtering and other methods can be used as well. Deposited metal may be provided on both sides of the film. Also, it may be subjected to a surface treatment or other resin-coating treatments.

Two or more sheets of thus prepared metallized polyester film are stacked and rolled up or a plurality of the said metallized polyester films are laminated to make a capacitor element, and the latter is subjected to the necessary treatments such as hot pressing, taping, metal spraying, attachment of leads, voltage treatment, end sealing, etc., according to the conventional methods to produce a capacitor. The above rolling-up treatment includes a rolling-up treatment of the film metallized on both sides and the other film including the film according to the present invention.

The film according to the present invention has the following excellent properties:

The TMA elongation is −2.0 to +2.0%, preferably −1.5 to +1.5%; the density is not more than 1.3990, preferably not less than 1.3980, more preferably not less than 1.3970;

The center line average roughness is 0.005 to 0.5 μm, preferably 0.01 to 0.3 μm, more preferably 0.02 to 0.1 μm;

The water droplet contact angle is not less than 60°, preferably not less than 62°;

The Young' modulus in the longitudinal direction at ordinary temperature is not less than 4.5 GPa, preferably mot less than 5.0 GPa; and The Young' modulus in the longitudinal direction at 100° C. is not less than 1.0 GPa, preferably not less than 1.2 GPa.

Further, the capacitor according to the present invention has the following properties:

The percentage of electrostatic capacity change is −8% to +10%, preferably −5% to +8%; and The drop of AC withstand voltage at 100° C. is very small or the AC withstand voltage drops to some extent at 100° C., but no problem for practical use.

The film according to the present invention shows excellent adhesion properties to electrode metals and, when used as dielectric of a metallized film capacitor, it provides high-degree electrical properties and moist heat resistance to the capacitor and contributes to the improvement of its long-time reliability. Thus, the film of the present invention has high industrial value.

EXAMPLES

The present invention is further illustrated by the following examples, but it should be understood that these examples are merely intended to be illustrative and not to be construed as limiting the scope of the invention. Evaluation methods employed in the Examples are described below. In the Examples and Comparative Examples, all "parts" are by weight unless otherwise noted.

(1) Intrinsic Viscosity of Polymer [η] (dl/g)

One gram of polymer was dissolved into a 100 ml of mixture solvent (phenol/tetrachloroethane=50/50, by weight). The intrinsic viscosity of the polymer solution was measured at 30° C. In the present invention, when the intrinsic viscosity is not less than 0.45 and less than 1.0, the film is put to practical use.

(2) Average Diameter of Particles (μm)

The average particle size was determined from the particle size of integrated volume (accumulative volume) of 50%, measured by a centrifugal sedimentation type particle-size distribution measurement analyzer (manufactured by Shimadzu Co. Ltd.: SA-CP3). In the present invention, when the average diameter of particles is 0.005 to 5.0 μm, it is put to practical use.

(3) Density of the Film (g/cm$^3$)

Density was measured by density-gradient tube method using a mixed solution of n-heptane and carbon tetrachloride at 25° C. In the present invention, when the density is not more than 1.3990, the film is put to practical use.

(4) Film Thickness (μm)

A weight of 100 pieces of 10 cm×10 cm sectioned square of the film was measured and the film thickness was calculated from the measured weight by using the following equation.

Film thickness (μm) = (Total weight of sectioned films (g) × 10$^4$)/(Film density (g/cm$^3$) × 100 (cm$^2$) × Number of sectioned film)

In the present invention, when the film thickness is 1 to 21 μm, the film is put to practical use.

(5) Heat Shrinkage Stress Property

The heat shrinkage stress of a strip sectioned specimen (width: 1 cm, length: 20 cm) was measured by a constant load elongation tester (manufactured Intesco Co., Ltd.). The specimen was set to a chuck gap (15 cm) and the measurement was started under initial load of 25 g/mm$^2$ at 23° C. The temperature of a thermostat attached to the tester was raised from the thermostat temperature of 23° C. by 4° C./min. Heat shrinkage stress generating is plotted as a function of the temperature and the initial heat shrinkage stress per cross sectional area was determined from the plot. In the present invention, when the heat shrinkage stress satisfies the formula (1) to (3), the film is put to practical use.

(6) Center Line Average Roughness (Ra)

Center line average roughness was determined in the following way using a surface roughness tester SE-3F (Kosaka Kenkyusho Co., Ltd.). A film portion with a reference length L (2.5 mm) was cut out in the direction of center line from a profile curve of the film, and when the roughness curve is represented by y=f(x) with the center line of the cut-out film portion being plotted as x-axis and the direction of longitudinal magnification as y-axis, the value given from the following formula was expressed as center line roughness (μm). As for center line average roughness, 10 profile curves of the film were selected from the sample film surface, and the mean value of center line average roughness of the cut-out portion determined from said sectional curves was expressed as center line average roughness. Measurement was made under the following conditions: radius the tip of the probe=2 μm; load=30 mg; cut-off=0.08 mm.

$$(1/L)\int_0^L |f(x)|dx$$

In the present invention, when the center line average roughness is 0.005 to 0.5 μm, the film is put to practical use.

(7) Young's Modulus

Young's modulus of a specimen film (length: 300 mm, width: 25 mm) was measured by a tensile tester (Intesco Model 2001, manufactured by Intesco Co., Ltd.) in a testing room at 23° C. under the humidity of 50% RH. The film was tensed under a rate of strain of 10%/min and the Young's modulus was calculated from the part of initial straight line in the tensile strength-strain relationship by the following formula.

$$E=\Delta\sigma/\Delta\epsilon$$

where E represents Young's modulus, Δσ represents the difference between the stress value at two positions in the initial straight line in the tensile strength-strain relationship and the stress value per unit cross sectional area calculated from the average cross sectional area of the specimen before tensile measurement, and Δε represents the difference between strain values at the same two positions. The film thickness used in the determination of the average cross sectional area was determined by the weight method, that is, the film thickness was calculated from the total weight of the 100 pieces (10 cm×10 cm square sectioned film) and the film density. In the present invention, when the Young's moduluses at ordinary temperature and 100° C. are not less than 4.5 GPa and not less than 1.0 GPa, respectively, the film is put to practical use.

(8) Water Droplet Contact Angle

Contact angle between distilled water drop and sample film was measured by a contact angle meter CA-DT-A (Kyowa Kaimen Kagaku Co., Ltd.) under an atmosphere of 23° C. and 50% RH. The water drop contact angle was measured at two points (left and right) for each of 3 samples, and the means of the 6 measurements was given as contact angle. Water droplet was 2 mm in diameter, and the value given one minute after dropping was read. In the present invention, when the water droplet contact angle is not less than 60°, the film is put to practical use.

(9) Withstand Voltage Property

Withstand voltage was measured according to JIS C-2319. That is, the voltage was elevated at a rate of 100 V/sec at 23° C. under 50% RH by use of a 10 kV direct current breakdown tester. The voltage at which a breakdown and short occur was measured. In the present invention, when the drop of DC withstand voltage is insufficiently small or almost none, the film is put to practical use.

(10) Dimensional Change Percentage (TMA Elongation)

A 5 mm wide sample film having a measuring length of 15 mm, with a load of about 80 g/mm$^2$ applied thereto, was heated at a rate of 10° C./min from ordinary temperature, and the dimensional change percentage on reaching 200° C. was measured using a thermomechanical analyzer (TMA) TM-7000 (Shinku Riko Co., Ltd.). Elongation was indicated as positive and shrinkage as negative. In the present invention, when the dimensional change percentage is −2.0% to +2.0%, the film is put to practical use.

(11) Evaluation of Electrical Properties of Capacitor

The capacitor was produced as follows and its AC withstand voltage, change of dielectric loss and change of electrostatic capacity were measured.

<Production of Capacitor>

Using a resistance-heating type metal depositor, with pressure in the vacuum chamber reduced to not more than 10$^{-4}$ Torr, aluminum was deposited on the film surface to a thickness of 450 Å. Deposition was made in a stripe pattern having margins in the lengthwise direction of the film (repetition of 8 mm wide deposited portions and 1 mm wide margins).

The thus obtained deposited film was slit into a 4.5 mm wide tape having 0.5 mm wide margins on the left or right edge. Two deposited films, one having margins on the left edge and the other having margins on the right edge, were put together and rolled up to obtain a roll of the film. In this case, two films were rolled up with a positional shift from each other so that the deposited portion of each film would jut out by a length of 0.5 mm in the widthwise direction. This roll of the film was pressed under a pressure of 50 kg/cm$^2$ at 140° C. for 5 minutes. Both end faces of the pressed roll were subjected to metallicon and, after attaching lead wires, a resin-impregnated layer is formed by impregnated with a liquid bisphenol A epoxy resin and then sheathing a cover with a minimum thickness of 0.5 mm formed by heat-melting a powdery epoxy resin, thereby producing a film capacitor with an electrostatic capacity of 0.1 μF.

<Determination of Change of Electrostatic Capacity>

The capacitor obtained in the manner described above was left in a temperature of 60° C. and a humidity of 95% RH for 1000 hours (Examples 1 to 5 and Comparative Examples 1 to 4) or a temperature of 85° C. and a humidity of 85% RH for 500 hours (Examples 6 to 10 and Comparative Examples 5 to 11) with a DC voltage of 60 V/μm applied across electrodes, and the electrostatic capacity change percentage was determined with the initial electrostatic capacity as reference. That is, initial electrostatic capacity was deducted from electrostatic capacity after 1000-hour or 500-hour standing, and the obtained value was divided by initial electrostatic capacity and shown by percentage. In the present invention, when the change of electrostatic capacity is −8% to +10%, the capacitor is put to practical use.

<Change of Dielectric Loss>

After an unused capacitor was allowed to stand at 150° C. for 24 hours, the dielectric loss property of before and after standing were compared. The dielectric loss were measured at the interval of 2° C. in the range of from room temperature to 160° C. at the frequency of 1 kHz. Then, by use of the temperature in which the dielectric loss was suddenly increased and the maximum value of the dielectric loss shown within the range of 100 to 160° C., the dielectric loss property were evaluated based on the following criterion. The measurements of the dielectric loss was conducted 10 times.

Rank A: The dielectric loss property is not almost changed after the standing at 150° C.

Rank B: The dielectric loss slightly increases or the suddenly increasing temperature become low.

Rank C: The change of the dielectric loss is remarkably large or the values varies widely.

In the present invention, when the change of dielectric loss is evaluated as Rank A or B, the capacitor is put to practical use.

<Alternative current withstand voltage>

An AC voltage of 1 kHz was applied across electrodes of the above capacitor and the time (t) that passed till occurrence of insulation failure was measured. The same measurement was made by changing the applied voltage (V). The relation between V and t was plotted, and the applied voltage at t=15 hr was expressed as AC withstand voltage. The value of such AC withstand voltage at 100° C. and that at 25° C. were compared and evaluations were made according to the following criterion:

Rank A: Drop of AC withstand voltage is insignificantly small even at 100° C. Good quality.

Rank B: AC withstand voltage drops to some extent at 100° C., but no problem for practical use.

Rank C: Drop of AC withstand voltage at 100° C. is excessive, and the capacitor can not stand practical use.

In the present invention, when the change of dielectric loss is evaluated as Rank A or B, the capacitor is put to practical use.

Example 1

<Production of Polyurethane for Coating Layer>

Polyester-polyol was prepared from 650 parts of terephthalic acid, 650 parts of isophthalic acid, 480 parts of 1,4-butanediol and 450 parts of neopentylglycol as starting materials. To the polyester-polyol, 320 parts of adipic acid and 270 parts of dimethylolpropionic acid were added to obtain polyester-polyol containing carboxyl groups. To 1880 parts of the obtained polyester-polyol, 160 parts of tolylene diisocyanate was added to prepare aromatic polyester-polyurethane solution. The obtained aromatic polyester-polyurethane solution was poured into aqueous ammonia solution and the solvent contained in the materials was removed, thereby obtaining water-dispersed aromatic polyester-polyurethane solution (A).

<Production of Polyester for the Film>

To a reactor, 100 parts of dimethylterephthalate, 60 parts of ethyleneglycol and 0.09 part of acetic acid calcium salt monohydrate were added and heated to conduct the ester-exchange reaction by removing methanol. The reaction temperature was raised to 230° C. for 4 hours and the esterexchange reaction was substantially completed.

Then, 0.3 part of silica particles having the particle size of 1.2 μm was added to the above reaction solution as an ethyleneglycol slurry. After adding the slurry, 0.06 part of phosphoric acid and diantimony trioxide were further added, the pressure of the reaction system was gradually reduced, the temperature of the reaction system was gradually raised, and the condensation reaction was carried out for 4 hours to obtain polyester (A) having an intrinsic viscosity of 0.65.

<Production of Polyester Film>

Polyester (A) was dried by ordinary way, supplied to an extruder, melted at 290° C., sheet-like extruded and chilled on a chill roll by adopting the electrostatic pinning method to obtain non-oriented sheet. The obtained sheet was stretched 2.9 times in longitudinal direction at 84° C. by use of roller stretching method and further stretched 1.25 times at 72° C. to obtain uniaxial oriented film.

The above water-dispersed polyurethane copolymer was coated to the both surfaces of the obtained uniaxially oriented film. Then, the coated film was stretched 4.1 times in the transverse direction at 110° C. by a tenter and subjected to conduct the heat-treatment at 230° C. during the heat-relaxing treatment of 8% in the transverse direction to obtain a biaxially oriented film having the thickness of the coating layer of 0.05 μm and the total thickness of the film of 5.0 μm. Table 1 shows the properties and characteristics of the obtained film and the metallized film capacitor produced from the said film. As seen from Table 1, the capacitor according to the present invention was excellent in the withstand voltage property, small change of electrostatic capacity and the long-time stability against moist heat.

Comparative Example 1

The same procedure as in Example 1 was carried out except that no coating solution was applied to obtain a polyester film. The properties and characteristics of the obtained film and metallized film capacitor were shown in Table 1. The capacitor produced from the said film was inferior to that of Example 1 in the long-time stability against moist heat.

Example 2

A water-dispersed aliphatic polyester-polyurethane (B) was obtained by the same procedure as in Example 1 except that 4,4'-dicyclohexylmethanediisocyanate was used instead of tolylene diisocyanate which was used in the production process of polyester-polyurethane for the coating composition.

The film was produced by the same procedure as in Example 1 except that the mixture of the aromatic polyester-polyurethane and the aliphatic polyester-polyurethane (60/40 by weight) was used as the coating composition and the heat-relaxing treatment of 10% was conducted at the heat-treatment process in the film formation. The properties and characteristics of the obtained film and the metallized film capacitor produced from the said film were shown in Table 1.

Example 3

The polyester copolymer resin as the coating composition was prepared as follows.

To a mixture of 30 parts of dimethylterephthalate, 70 parts of dimethylisophthalate, 15 parts of dimethylsebacate, 6 parts of sodium salt of dimethyl-5-sulfoisophthalate and 80 parts of ethylene glycol as starting materials, 0.04 part of manganese acetate tetrahydrate was added. Then, the reaction mixture was heated and esterexchange reaction was carried out by removing methanol. The reaction temperature was raised to 230° C. for 3 hours and the esterexchange reaction was substantially completed.

To the reaction mixture, 0.01 part of phosphoric acid was added and further, 0.04 part of diantimony trioxide was added. Then, the polycondensation reaction was carried out for 4 hours to obtain polyester copolymer having an intrinsic viscosity of 0.50. Next, 20 parts of the obtained polyester copolymer was dissolved into 80 parts of tetrahydrofuran. To the prepared solution, 180 parts of water was added with high-speed stirring. The mixture was heated and tetrahydrofuran was removed to obtain water-dispersed polyester copolymer (C).

The obtained water-dispersed polyester copolymer (C) was mixed with water-dispersed polyester-polyurethane (A) produced in Example 1. The mixing ratio of polyester/aromatic polyester-polyurethane as solid matter was 10 parts/80 parts. To the resultant mixture, 10 parts of triethyleneglycol diglycidylether as a crosslinking agent was added to prepare the coating composition. The same procedure as in Example 1 was conducted except that the above prepared coating composition was used and the heat-relaxing treatment of 10% in the heat-treatment process in the film formation was conducted, thereby obtaining a film having the coating layer thickness of 0.05 μm and the total film thickness of 5.0 μm. The properties and characteristics of the obtained film and metallized film capacitor were shown in Table 1.

Example 4

The same procedure as in Example 1 was conducted except that the coating composition used in Example 2 was used, the heat-relaxing treatment of 10% in the heat-treatment process in the film formation was conducted, and the temperature of the heat-treatment was 210° C., thereby obtaining a film having the coating layer thickness of 0.04 μm and the total film thickness of 5.0 μm. The properties and characteristics of the obtained film and metallized film capacitor were shown in Table 1.

Comparative Example 2

The same procedure as in Example 1 was conducted except that the heat-relaxing treatment of 3% in the heat-treatment process in the film formation was conducted to obtain a film having the coating layer thickness of 0.04 μm and the total film thickness of 5.0 μm. The properties and characteristics of the obtained film and metallized film capacitor were shown in Table 1. As seen from Table 1, the obtained capacitor was inferior to that of Examples in the withstand voltage.

Comparative Example 3

The same procedure as in Example 1 was conducted except that the heat-relaxing treatment in the heat-treatment process in the film formation was not conducted to obtain a film having the coating layer thickness of 0.04 μm and the total film thickness of 5.0 μm. The properties and characteristics of the obtained film and metallized film capacitor were shown in Table 1. As seen from Table 1, the obtained capacitor was inferior to that of Examples in the withstand voltage.

Example 5

The same procedure as in Example 1 was conducted except that the coating composition used in Example 2 was used, the heat-relaxing treatment of 3% in the heat-treatment process in the film forming was conducted to obtain a film. Then, the film was subjected to "heat-floating type treating", with blowing air of 200° C. to both surfaces of the film for 5 seconds, under a running tension of 1 kg/cm² in longitudinal direction and no tension in width direction, then cooled to not more than 70° C. and rolled up, thereby obtaining a film having the coating layer thickness of 0.04 μm and the total film thickness of 5.0 μm. The properties and characteristics of the obtained film and metallized film capacitor were shown in Table 1.

Comparative Example 4

The same procedure as in Example 1 was conducted except that the temperature of the heat-treatment was 242° C., the heat-relaxing treatment in the heat-treatment process in the film forming was not conducted, and the relaxing of 4% was conducted in a gradually chilling zone in the following step, to obtain a film having the coating layer thickness of a 0.04 μm and the total film thickness of 5.0 μm. The obtained film properties and the properties of metallized film capacitor were shown in Table 1.

TABLE 1

|  | Example 1 | Example 2 | Example 3 |
|---|---|---|---|
| $S_{120}$ (g/mm²) | 50 | 45 | 45 |
| $S_{150}$ (g/mm²) | 110 | 100 | 100 |
| $S_{150}$–$S_{120}$ (g/mm²) | 60 | 55 | 55 |
| $S_{max}$ (g/mm²) | 300 | 270 | 280 |
| Ra (μm) (X10⁻³) | 57 | 57 | 58 |
| Water droplet contact angle (°) | 63 | 62 | 62 |
| Young's modulus in longitudinal direction (GPa) | 5.2 | 5.0 | 5.0 |
| Withstand voltage property (KV/μm) | 0.55 | 0.55 | 0.55 |
| Percentage of electrostatic capacity change (%) | 2.0 | 2.5 | 1.5 |
| Rank of change of dielectric loss | A | A | A |
| Rank of AC withstand voltage | A | A | A |

|  | Example 4 | Example 5 | Comparative Example 1 |
|---|---|---|---|
| $S_{120}$ (g/mm²) | 50 | 0 | 30 |
| $S_{150}$ (g/mm²) | 120 | 0 | 80 |
| $S_{150}$–$S_{120}$ (g/mm²) | 70 | 0 | 50 |
| $S_{max}$ (g/mm²) | 350 | 240 | 240 |
| Ra (μm) (X10⁻³) | 56 | 56 | 54 |
| Water droplet contact angle (°) | 63 | 63 | 66 |
| Young's modulus in longitudinal direction (GPa) | 5.5 | 5.0 | 5.2 |
| Withstand voltage property (KV/μm) | 0.57 | 0.48 | 0.54 |
| Percentage of electrostatic capacity change (%) | 1.5 | 0.5 | −25.5 |
| Rank of change of dielectric loss | B | A | B |
| Rank of AC withstand voltage | A | B | B |

|  | Comparative Example 2 | Comparative Example 3 | Comparative Example 4 |
|---|---|---|---|
| $S_{120}$ (g/mm²) | 110 | 130 | 15 |
| $S_{150}$ (g/mm²) | 180 | 240 | 120 |
| $S_{150}$–$S_{120}$ (g/mm²) | 70 | 110 | 105 |

TABLE 1-continued

| $S_{max}$ (g/mm²) | 550 | 580 | 260 |
|---|---|---|---|
| Ra (μm) (X10⁻³) | 55 | 55 | 56 |
| Water droplet contact angle (°) | 63 | 63 | 63 |
| Young's modulus in longitudinal direction (GPa) | 5.3 | 5.4 | 4.9 |
| Withstand voltage property (KV/μm) | 0.53 | 0.50 | 0.50 |
| Percentage of electrostatic capacity change (%) | −2.0 | −3.0 | −8.0 |
| Rank of change of dielectric loss | B | C | B |
| Rank of AC withstand voltage | C | C | C |

Example 6

<Production of Polyester Film>

Polyethylene terephthalate having an intrinsic viscosity of 0.66 and containing 0.3% of silica particles having an average diameter of 1.2 μm was melt extruded at 290° C. according to conventional method to form an amorphous sheet. This sheet was stretched 4.2 times in the longitudinal direction at 90° C., and then a coating solution of the composition (solid weight) shown in Table 2, using water as medium, was applied on both sides of the obtained film. The coated film was stretched 3.9 times in the transverse direction at 110° C. and heat treated at 215° C. to obtain a biaxially stretched polyester film having a coating thickness of 0.05 μm and a total polyester film thickness of 4 μm. This biaxially oriented film, with no restrictions on its width direction, was subjected to a heat floatation treatment, that is, the film, while floated up by 200° C. hot air, was treated under a running tension of 0.5 kg/cm² for 4.5 seconds, then cooled to lower than 70° C. and rolled up.

As for the alkaline metal contents in the coating solution, Na content was 5.0 ppm and K content was 1.8 ppm, calculated as solid content, other alkaline metals being below limit of detection. Water droplet contact angle of the coating layer was 63° and center line average roughness (Ra) was 0.025 μm.

The metallized film capacitor produced by using the above film had excellent dielectric strength and moist heat resistance as seen from Table 3.

Results of other Examples and Comparative Examples described below are also shown in Table 3.

Comparative Example 5

The same procedure as in Example 1 was carried out except that no coating solution was applied to obtain a polyester film.

Comparative Example 6

The same procedure as in Example 6 was carried out except that no floating type heat-treatment was conducted to obtain a polyester film.

Examples 7–10 and Comparative Examples 7–10

The same procedures as in Example 6 was carried out except that the conditions of the floating type heat-treatment were changed as shown in Table 2 to obtain polyester films.

TABLE 2

| | Floating type heat-treatment conditions | | |
|---|---|---|---|
| | Temperature (° C.) | Running tension (kg/cm$^2$) | Time (sec) |
| Example 6 | 200 | 0.5 | 4.5 |
| Comparative Example 5 | 200 | 0.5 | 4.5 |
| Comparative Example 6 | — | — | — |
| Example 7 | 180 | 0.5 | 4.5 |
| Example 8 | 210 | 0.5 | 4.5 |
| Comparative Example 7 | 230 | 0.5 | 4.5 |
| Comparative Example 8 | 150 | 0.5 | 4.5 |
| Example 9 | 200 | 0.8 | 4.5 |
| Comparative Example 9 | 200 | 1.1 | 4.5 |
| Example 10 | 200 | 0.5 | 1.0 |
| Comparative Example 10 | 200 | 0.5 | 0.4 |

| | Film properties | |
|---|---|---|
| | TMA elongation (%) | Film density (g/cm$^3$) |
| Example 6 | +0.3 | 1.3945 |
| Comparative Example 5 | +0.3 | 1.3944 |
| Comparative Example 6 | −4.7 | 1.3935 |
| Example 7 | −1.9 | 1.3937 |
| Example 8 | +1.0 | 1.3965 |
| Comparative Example 7 | Film was badly damaged by heat shrinkage. | |
| Comparative Example 8 | −4.7 | 1.3935 |
| Example 9 | −1.7 | 1.3945 |
| Comparative Example 9 | −8.5 | 1.3945 |
| Example 10 | −1.7 | 1.3937 |
| Comparative Example 10 | −3.5 | 1.3935 |

Note: In all specimens, the heat-treatment was conducted at 215° C. for 7 seconds.

TABLE 3

| | Property evaluation | | | |
|---|---|---|---|---|
| | Ra (μm) | Water droplet contact angle | Change of electrostatic capacity (%) | Ranking by AC withstand voltage |
| Example 6 | 0.025 | 64° | 4.5 | A |
| Comparative Example 5 | 0.025 | 66° | −42.5 | A |
| Comparative Example 6 | 0.025 | 64° | −5.7 | C |
| Example 7 | 0.025 | 64° | 2.0 | B |
| Example 8 | 0.025 | 64° | 5.0 | A |
| Comparative Example 7 | 0.025 | 64° | — | — |
| Comparative Example 8 | 0.025 | 64° | −4.7 | C |
| Example 9 | 0.025 | 64° | 1.7 | B |
| Comparative Example 9 | 0.025 | 64° | −10.5 | C |
| Example 10 | 0.025 | 64° | 4.7 | A |
| Comparative Example 10 | 0.025 | 64° | −7.3 | C |

Examples 11–15

The film obtained in Example 1 was subjected to the heat-floating type treating, with blowing hot air to both surfaces of the film, under a running tension in longitudinal direction and no tension in width direction. The treating condition is shown in Table 4. Then, the film was cooled to not more than 70° C. and rolled up, to obtain the object film. The properties and characteristics of the obtained film and the metallized film capacitor produced from the said film were shown in Table 4.

Example 16

The same procedure as defined in Example 11 was conducted except that the heat-floating type treating was twice conducted under the condition shown in Table 4, to obtain the object film. The properties and characteristics of the obtained film and the metallized film capacitor produced from the said film were shown in Table 4.

TABLE 4

| | Example 11 | Example 12 | Example 13 |
|---|---|---|---|
| Temperature (° C.) | 200 | 200 | 200 |
| Running tension (kg/cm$^2$) | 1 | 0.5 | 0.3 |
| Time (sec) | 5 | 5 | 5 |
| $S_{120}$ (g/mm$^2$) | 0 | 0 | 0 |
| $S_{150}$ (g/mm$^2$) | 0 | 0 | 0 |
| $S_{150}$–$S_{120}$ (g/mm$^2$) | 0 | 0 | 0 |
| $S_{max}$ (g/mm$^2$) | 200 | 150 | 100 |
| Ra (μm) (X10$^{-3}$) | 56 | 56 | 56 |
| Water droplet contact angle (°) | 63 | 63 | 63 |
| Young's modulus in longitudinal direction (GPa) | 5.0 | 5.0 | 5.0 |
| Withstand voltage property (KV/μm) | 0.49 | 0.49 | 0.49 |
| Percentage of electrostatic capacity change (%) | 0.5 | 0.5 | 0.5 |
| Rank of change of dielectric loss | A | A | A |
| Rank of AC withstand voltage | A | A | B |

| | Example 14 | Example 15 | Example 16 |
|---|---|---|---|
| Temperature (° C.) | 210 | 220 | 200, 230 |
| Running tension (kg/cm$^2$) | 0.3 | 0.2 | 0.5, 0.1 |
| Time (sec) | 5 | 7 | 5, 5 |
| $S_{120}$ (g/mm$^2$) | 0 | 0 | 0 |
| $S_{150}$ (g/mm$^2$) | 0 | 0 | 0 |
| $S_{150}$–$S_{120}$ (g/mm$^2$) | 0 | 0 | 0 |
| $S_{max}$ (g/mm$^2$) | 70 | 40 | 0 |
| Ra (μm) (X10$^{-3}$) | 56 | 56 | 57 |
| Water droplet contact angle (°) | 63 | 63 | 65 |
| Young's modulus in longitudinal direction (GPa) | 4.9 | 4.8 | 4.5 |
| Withstand voltage property (KV/μm) | 0.49 | 0.49 | 0.46 |
| Percentage of electrostatic capacity change (%) | 0.5 | 0.5 | 0.5 |
| Rank of change of dielectric loss | A | A | B |
| Rank of AC withstand voltage | B | B | B |

Example 17

The same procedure as defined in Example 1 was conducted except that the heat-treatment at 210° C. during the heat-relaxing treatment of 7% in the film forming process was conducted, to obtain a biaxially oriented film having the thickness of the coating layer of 0.05 μm and the total thickness of the film of 5.0 μm. The properties and characteristics of the obtained film and the metallized film capacitor produced from the said film were shown in Table 5.

Example 18

The same procedure as defined in Example 1 was conducted except that the heat-relaxing treatment of 5% in the film forming process was conducted, to obtain a biaxially oriented film having the thickness of the coating layer of 0.05 μm and the total thickness of the film of 5.0 μm. The properties and characteristics of the obtained film and the metallized film capacitor produced from the said film were shown in Table 5.

TABLE 5

| | Example 17 | Example 18 |
|---|---|---|
| $S_{120}$ (g/mm$^2$) | 55 | 90 |
| $S_{150}$ (g/mm$^2$) | 135 | 155 |
| $S_{150}-S_{120}$ (g/mm$^2$) | 90 | 65 |
| $S_{max}$ (g/mm$^2$) | 380 | 430 |
| Ra (μm) (X10$^{-3}$) | 56 | 56 |
| Water droplet contact angle (°) | 63 | 63 |
| Young's modulus in longitudinal direction (GPa) | 5.6 | 5.3 |
| Withstand voltage property (KV/μm) | 0.57 | 0.55 |
| Percentage of electrostatic capacity change (%) | −1.0 | −1.5 |
| Rank of change of dielectric loss | B | B |
| Rank of AC withstand voltage | A | B |

What is claimed is:

1. A biaxially oriented polyester film for capacitor, which polyester film comprises a polyester having structural repeating units constituted from polyethylene terephthalate units of 80 mol % or more in the structural repeating units, has at least one coating layer of a thickness of 0.005 μm to 0.5 μm on the polyester film comprising water soluble or water dispersible resin, has a total thickness of 1.0 to 21 μm, and has a heat shrinkage stress satisfying the following formulae (1) to (3):

$S_{150} < 200$ g/mm$^2$ $S_{150} - S_{120} < 100$ g/mm$^2$ $S_{max} < 500$ g/mm$^2$ where $S_{150}$ and $S_{120}$ represent the values of heat shrinkage stress per unit cross section area of the film at 150° C. and 120° C., respectively, and $S_{max}$ represents the maximum value of the heat shrinkage stress at the temperature within a range of not less than 150° C. and not more than the melting point of the film.

2. The biaxially oriented polyester film for capacitor according to claim 1, wherein the water soluble or water dispersible resin is urethane resin having anionic groups and the content of anionic groups is 0.005 to 10% by weight.

3. The biaxially oriented polyester film for capacitor according to claim 1, wherein the content of urethane resin in the coating layer is not less than 30% by weight based on the weight of the coating layer.

4. The biaxially oriented polyester film for capacitor according to claim 1, wherein the alkali metal content in the coating composition containing the water soluble or water dispersible resin is not more than 500 ppm.

5. The biaxially oriented polyester film for capacitor according to claim 1, wherein the water droplet contact angle of the coating layer is not less than 60° and the center line average roughness of the coating layer surface is 0.005 to 0.5 μm.

6. The biaxially oriented polyester film for capacitor according to claim 1, wherein density of the polyester film having coating layer is not more than 1.3990.

7. The biaxially oriented polyester film for capacitor according to claim 1, wherein the value of $S_{120}$ in the formula (2) is 10 to 200 g/mm$^2$.

8. The biaxially oriented polyester film for capacitor according to claim 1, wherein the Young's modulus of the film in longitudinal direction at 23° C. is not less than 4.5 Gpa and the Young's modulus of the film in longitudinal direction at 100° C. is not less than 1.0 Gpa.

9. The biaxially oriented polyester film for capacitor according to claim 1, wherein the dimensional change percentage in the longitudinal direction of the film at 200° C. measured by a thermomechanical analyzer (TMA) is within the range from −2% to +2%.

10. The biaxially oriented polyester film for capacitor according to claim 9, wherein density of the polyester film having coating layer is not more than 1.3990.

11. A metallized polyester film for capacitor comprising said polyester film having a coating layer defined in claim 1 and having a metal deposited on one side or both sides thereof.

12. The metallized polyester film for capacitor according to claim 11, wherein the thickness of the metallized film is 10 to 5,000 Å.

13. A capacitor comprising the metallized polyester film defined in claim 11.

14. A biaxially oriented polyester film for capacitor, which polyester film comprises a polyester having structural repeating units constituted from polyethylene terephthalate units of 80 mol % or more in the structural repeating units, has at least one coating layer of a thickness of 0.005 μm to 0.5 μm on the polyester film comprising water soluble or water dispersible resin, has a total thickness of 1.0 to 21 μm, and has a heat shrinkage stress satisfying the following formulae (1) to (3):

| $S_{150}$ | < 200 g/mm$^2$ |
| $S_{150}-S_{120}$ | < 100 g/mm$^2$ |
| $S_{max}$ | < 500 g/mm$^2$ | where $S_{150}$ and $S_{120}$ represent the values of heat shrinkage stress per unit cross section area of the film at 150° C. and 120° C., respectively, and $S_{max}$ represents the maximum value of the heat shrinkage stress at the temperature within a range of not less than 150° C. and not more than the melting point of the film, which biaxially oriented polyester film is produced by a process which comprises a step of heat-relaxing treatment in the longitudinal direction, transverse direction, or both directions within the range of 3 to 30% at a temperature within the range of 180° C. to 240° C., or a step of heat-relaxing treatment of the film under off-line and a running tension of 0.01 to 1 kg/mm$^2$ at a temperature of 160° C. to 220° C.

* * * * *